United States Patent
Okazaki et al.

(10) Patent No.: US 10,773,147 B2
(45) Date of Patent: Sep. 15, 2020

(54) VIRTUAL GOLF SIMULATION APPARATUS

(71) Applicant: Sumitomo Rubber Industries, Ltd., Hyogo (JP)

(72) Inventors: Kousuke Okazaki, Kobe (JP); Yuto Nakamura, Kobe (JP); Masahiko Ueda, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 16/286,832

(22) Filed: Feb. 27, 2019

(65) Prior Publication Data

US 2019/0269994 A1    Sep. 5, 2019

(30) Foreign Application Priority Data

Mar. 5, 2018 (JP) .................................. 2018-038872

(51) Int. Cl.
*A63B 71/00* (2006.01)
*A63B 71/06* (2006.01)
*A63B 69/36* (2006.01)

(52) U.S. Cl.
CPC ...... *A63B 71/0622* (2013.01); *A63B 69/3658* (2013.01); *A63B 2071/0636* (2013.01); *A63B 2071/0638* (2013.01)

(58) Field of Classification Search
None
See application file for complete search history.

(56) References Cited

U.S. PATENT DOCUMENTS 8,597,142 B2 * 12/2013 Mayles ............... A63F 13/5258
473/226
2012/0295677 A1 * 11/2012 Ok ..................... A63B 24/0021
463/2

FOREIGN PATENT DOCUMENTS

| JP | 2007-301173 A | 11/2007 |
| JP | 2013-516212 A | 5/2013 |
| JP | 2017-038916 A | 2/2017 |

* cited by examiner

*Primary Examiner* — Paul A D'Agostino
(74) *Attorney, Agent, or Firm* — Studebaker & Brackett PC

(57) ABSTRACT

Provided is a virtual golf simulation apparatus including a processor. The processor is connected to an output device and is configured to acquire measurement data obtained by using a measurement device to measure an actual shot performed by a golfer, analyze a shot characteristic of the golfer based on the measurement data, virtually generate a virtual golfer having a shot characteristic corresponding to the shot characteristic of the golfer, receive, from the golfer, an instruction instructing the virtual golfer to perform an action in a virtual space, simulate a shot of the virtual golfer in the virtual space in accordance with the instruction, and output a result of the simulation to the output device.

19 Claims, 7 Drawing Sheets

VIRTUAL GOLF SIMULATION APPARATUS

CROSS REFERENCE TO RELATED APPLICATION

This application claims a priority to Japanese Patent Application No. 2018-38872 filed on Mar. 5, 2018, which is hereby incorporated by reference in its entirety.

FIELD OF INVENTION

The present invention relates to a virtual golf simulation apparatus.

BACKGROUND

Conventionally, various types of golf game machines have been known. Typically, there are game machines that allow a user to virtually progress through a golf course by causing a user to operate an input device of the game machine (e.g., see JP 2017-38916A, which is Patent Document 1). Although this type of game machine is an amusement machine through which the user enjoys virtual golf without actually swinging a golf club, on the other hand, there are also game machines that cause the user to actually swing a golf club in a hitting base that is installed near the game machine. With the latter game machine, the actual golf swing performed by the user is calculated using a calculation apparatus and simulated using a computer, and the user is allowed to virtually progress through the golf course in accordance with the simulation result (e.g., see JP 2013-516212, which is Patent Document 2, and JP 2007-301173A, which is Patent Document 3). This type of apparatus, which simulates an actual golf swing, can also be used in applications such as golf practice, rather than being an amusement machine.

SUMMARY OF THE INVENTION

A game machine such as that disclosed in Patent Document 1 cannot reflect the actual golf ability of the user. On the other hand, with apparatuses such as those disclosed in Patent Documents 2 and 3, although the game progresses in a manner reflecting the actual golf ability of the user, the user needs to perform the golf swing many times in order to cause the game to progress, which is a large burden. Also, the hitting base and the measurement device need to be installed, and thus there are restrictions on the environment for implementing virtual golf.

The present invention aims to provide a virtual golf simulation apparatus, program, and method, according to which virtual golf reflecting the actual golf ability of a golfer can be easily executed.

A virtual golf simulation apparatus according to one aspect includes: a data acquisition unit configured to acquire measurement data obtained by using a measurement device to measure an actual shot performed by a golfer; an analysis unit configured to analyze a shot characteristic of the golfer based on the measurement data; a generation unit configured to virtually generate a virtual golfer having a shot characteristic corresponding to the shot characteristic of the golfer; an operation receiving unit configured to receive, from the golfer, an instruction instructing the virtual golfer to perform an action in a virtual space; a simulation unit configured to simulate a shot of the virtual golfer in the virtual space in accordance with the instruction; and an output unit configured to output a result of the simulation.

The operation receiving unit may receive selection of a golf course serving as the virtual space, and the simulation unit may successively simulate shots of the virtual golfer such that the virtual golfer virtually progresses through the golf course.

The simulation unit may successively simulate multiple shots so as to cause the virtual golfer to play a virtual round in the golf course.

The measurement data may include data relating to at least one of a flight distance, a head velocity, a ball velocity, a launch angle, a lateral deflection angle, a spin amount, a variation degree, a face angle, and a head path angle.

The shot characteristic may include characteristics relating to at least one of the flight distance, lateral deflection, a miss direction, and a missed shot probability.

For each shot of the virtual golfer, the operation receiving unit may receive selection of a golf club to be used by the virtual golfer, out of a group of a plurality of types of golf clubs selected from a driver, a fairway wood, a utility, an iron, a wedge, and a putter.

The output unit may generate an image showing the virtual space in two dimensions or three dimensions.

The output unit may generate an image in which a character imitating the virtual golfer moves in the virtual space.

The data acquisition unit may acquire the measurement data from the measurement device or a server that is connected to the measurement device and in which the measurement data transmitted from the measurement device is accumulated.

According to the present invention, a shot characteristic of a golfer is analyzed based on measurement data of an actual shot performed by the golfer, and a virtual golfer having a shot characteristic corresponding to the golfer's shot characteristic is generated virtually. Then, a shot of the virtual golfer in a virtual space is simulated in accordance with the operation performed by the golfer, and the result of the simulation is output. That is, the virtual golfer, which is also to be called an "avatar", having an ability corresponding to the actual golf ability of the golfer is generated, the virtual golfer is operated by the golfer, and thus virtual golf is executed. Accordingly, virtual golf reflecting the actual golf ability of the golfer can be easily executed.

DETAILED DESCRIPTION OF THE PREFERRED EMBODIMENTS

Hereinafter, a virtual golf simulation apparatus, program, and method according to an embodiment of the present invention will be described with reference to the drawings.

1. Overall Configuration of Virtual Golf Simulation System

Figure 1:
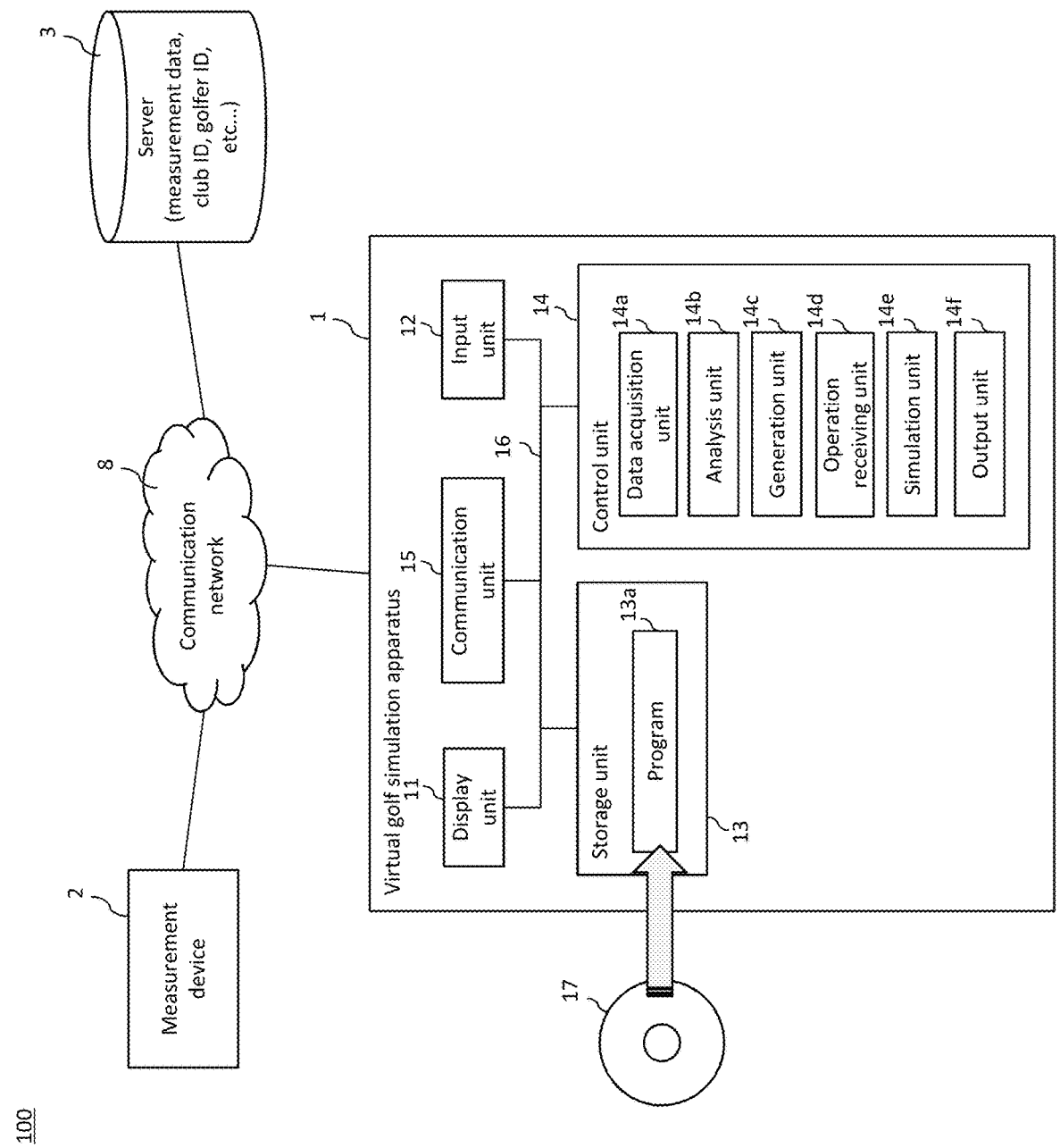
FIG. 1 is a diagram showing functional blocks of a virtual golf simulation system including a virtual golf simulation apparatus according to an embodiment of the present invention.

FIG. 1 shows an overall configuration of a virtual golf simulation system 100 including a virtual golf simulation apparatus 1 (hereinafter referred to as "simulation apparatus 1" in some cases) according to the present embodiment. The simulation apparatus 1 is an apparatus that provides a golfer G with virtual golf reflecting the actual golf ability of the golfer G. Virtual golf is executed in various applications, and for purposes such as amusement, assessing golf ability, and learning golf. For this reason, the simulation apparatus 1 acquires measurement data obtained by measuring an actual shot performed by the golfer G, analyzes the shot characteristic of the golfer G based on the measurement data, and virtually generates a virtual golfer Gv having a shot characteristic corresponding to that of the golfer G. Then, the golfer G instructs the virtual golfer Gv to perform an action, the shot of the virtual golfer Gv in the virtual space is simulated in accordance with the instruction, and the result of the simulation is output. That is, the virtual golfer Gv, which is also to be called an "avatar", having an ability corresponding to the actual golf ability of the golfer G is generated, and virtual golf is executed due to the golfer G operating the virtual golfer Gv.

Measurement of the actual shot of the golfer G is executed by the measurement device 2. As shown in FIG. 1, the measurement device 2 is connected to a communication network 8 such as the Internet, and uploads measurement data to a server 3 via the communication network 8. The server 3 accumulates the measurement data transmitted from the measurement device 2 and transmits measurement data to the simulation apparatus 1 in response to a request from the simulation apparatus 1 connected similarly to the communication network 8.

The simulation apparatus 1, the measurement device 2, and the server 3 constitute the virtual golf simulation system 100. Hereinafter, the configurations of the measurement device 2, the server 3, and the virtual golf simulation apparatus 1 will be described, and thereafter a flow of processing for executing virtual golf will be described.

2. Configuration of Units 2-1. Measurement Device

Figure 2:
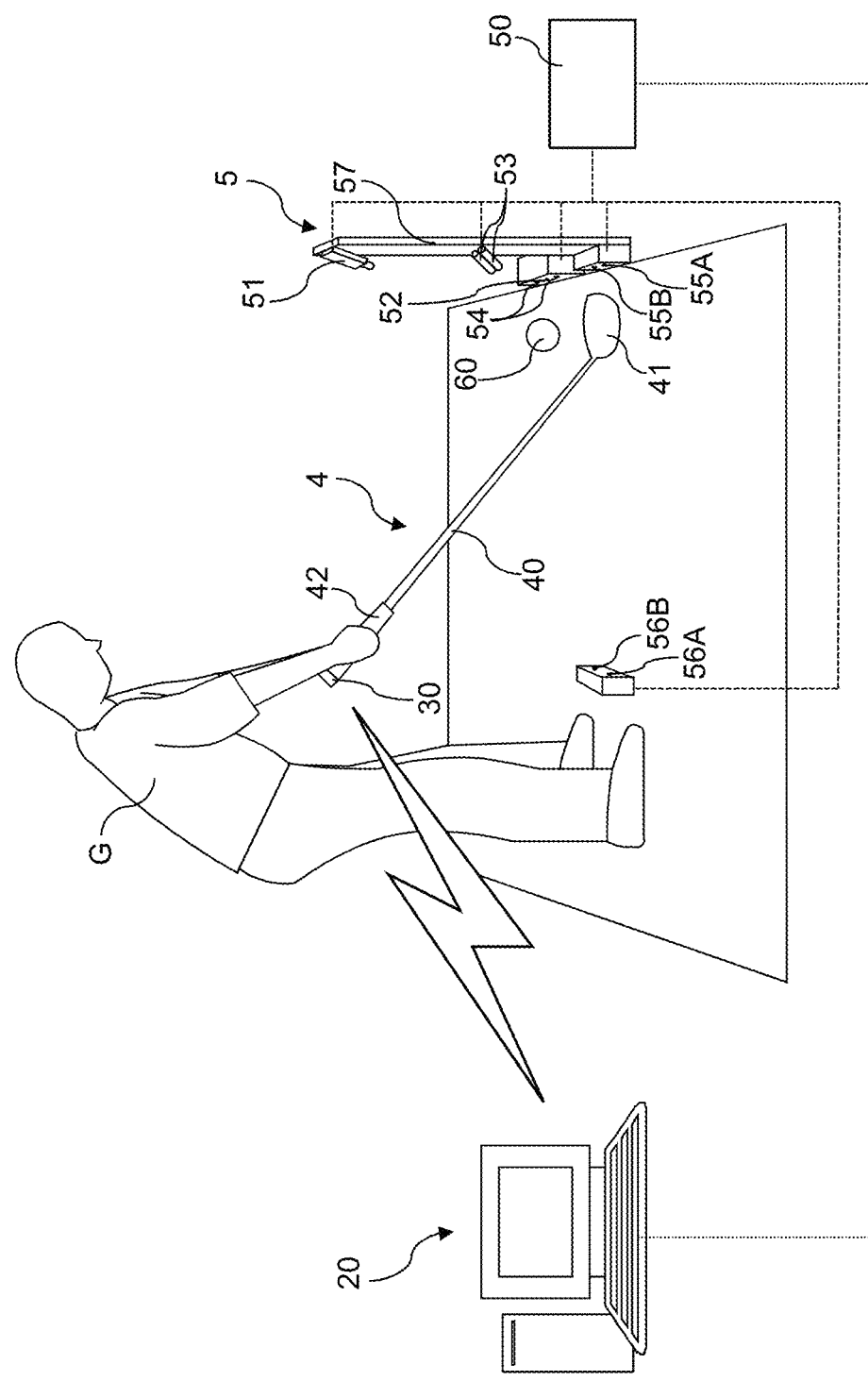
FIG. 2 is a diagram showing a configuration of a measurement device according to an embodiment of the present invention.
Figure 3:
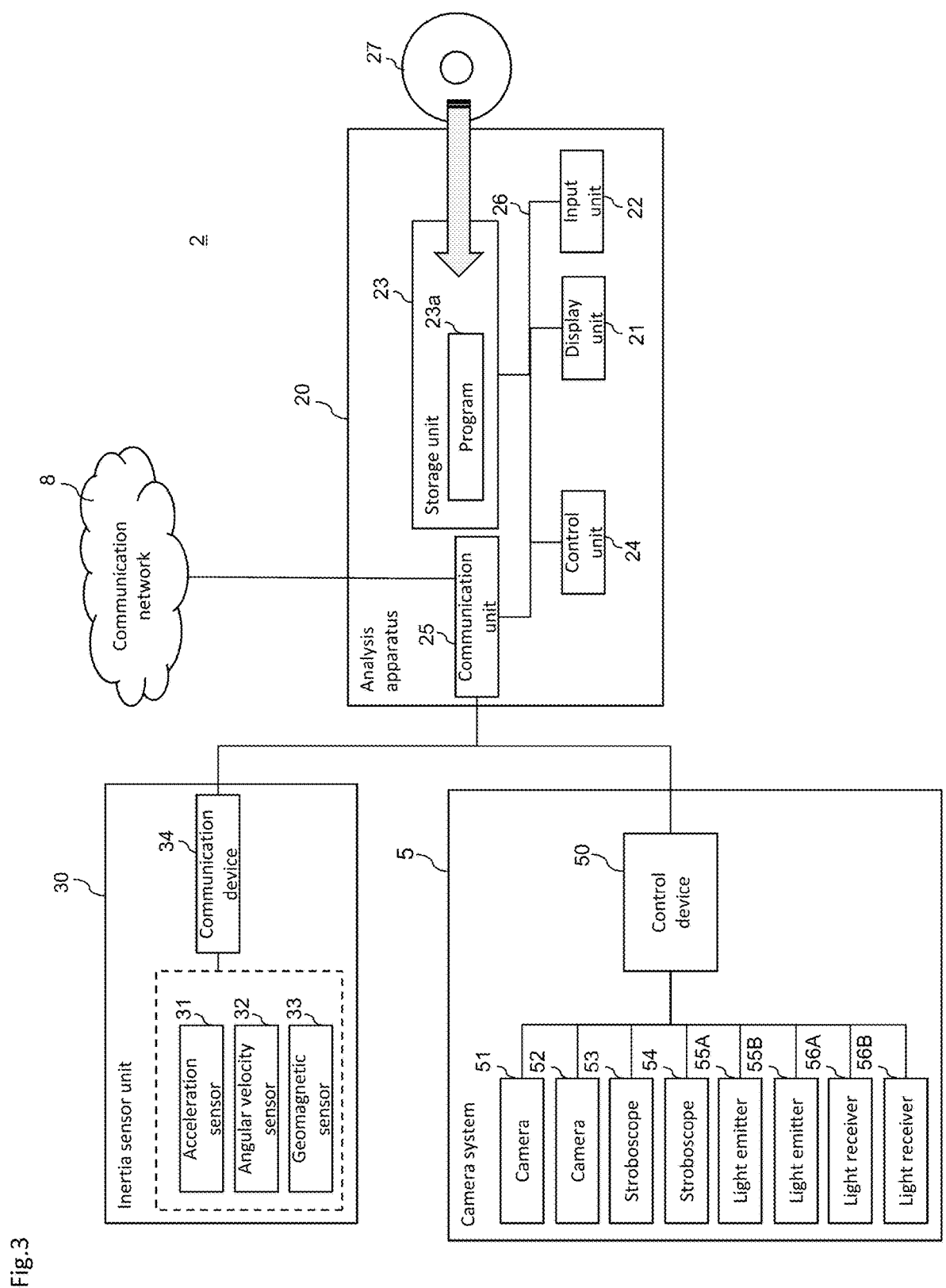
FIG. 3 is a diagram showing functional blocks of the measurement device shown in FIG. 2.

As shown in FIGS. 2 and 3, the measurement device 2 according to the present embodiment is realized as an inertia sensor unit 30, a camera system 5, and an analysis apparatus 20 connected thereto. However, the configuration of the measurement device 2 is not limited thereto, and the configuration is not particularly limited as long as measurement data that is suitable for analyzing the shot characteristic of the golfer G can be measured.

The measurement device 2 according to the present embodiment is installed at a specialized location, such as a golf school or a store selling golf equipment. At this kind of specific location, the golfer G performs a trial stroke of a golf club 4 to which the inertia sensor unit 30 is attached in a hitting base in which the camera system 5 is installed, in order to determine a golf club suited to the golfer G (for a so-called "fitting"), to assess the golf ability of the golfer G, and the like.

2-1-1. Inertia Sensor Unit

As shown in FIG. 2, the inertia sensor unit 30 is attached to the end portion of the golf club 4 on the side of a grip 42, which is opposite to a head 41, and the inertia sensor unit 30 measures the behavior of the grip 42. Note that the golf club 4 is a common golf club, and is constituted by a shaft 40, the head 41 provided on one end of the shaft 40, and the grip 42 provided on the other end of the shaft 40. The inertia sensor unit 30 is small and light so as not to hinder a swing action. The inertia sensor unit 30 can attach to and detach from the golf club 4.

As shown in FIG. 3, an acceleration sensor 31, an angular velocity sensor 32, and a geomagnetic sensor 33 are equipped in the inertia sensor unit 30. A communication device 34 for transmitting sensor data output from the sensors 31 to 33 to an external analysis apparatus 20 is also mounted in the inertia sensor unit 30. Note that in the present embodiment, the communication device 34 is wireless so as not to hinder the swing action, but the communication device 34 may also be connected to the analysis apparatus 20 in a wired manner via a cable.

The acceleration sensor 31, the angular velocity sensor 32, and the geomagnetic sensor 33 detect data on the acceleration, angular velocity, and geomagnetism in xyz local coordinate systems whose origins are the positions at which these sensors 31 to 33 are attached. More specifically, the acceleration sensor 31 measures the accelerations $a_x$, $a_y$, and $a_z$ in x axis, y axis, and z axis directions. The angular velocity sensor 32 measures angular velocities $\omega_x$, $\omega_y$, and $\omega_z$ about an x axis, a y axis, and a z axis. The geomagnetic sensor 33 measures geomagnetism $m_x$, $m_y$, and $m_z$ in x axis, y axis, and z axis directions. These pieces of sensor data are transmitted to the analysis apparatus 20 via the communication device 34.

2-1-2. Camera System

As shown in FIGS. 2 and 3, the camera system 5 includes multiple cameras 51 and 52, and multiple stroboscopes 53, 53, 54, and 54, and performs stroboscopic imaging. A camera 51 is attached to a support platform 57 on the front surface of the golfer G and is arranged obliquely above a ball 60 at address such that the head 41 and the ball 60 can be imaged from above before and after impact. The stroboscopes 53 and 53 are also fixed to the support platform 57 and arranged below the camera 51. Also, a camera 52 is arranged in front of the ball 60 at address on the front surface side of the golfer G such that the head 41 and the ball 60 can be imaged from a position different from that of the camera 51, before and after impact. The stroboscopes 54 and 54 are arranged to the left and right of the camera 52. Note that markers in the form of dots or lines are provided on the golf ball 60 such that the behavior of the ball 60 can be extracted from the image data captured by the cameras 51 and 52.

Also, the camera 5 includes light emitters 55A and 55B and light receivers 56A and 56B, the light emitter 55A and the light receiver 56A constitute one timing sensor, and the light emitter 55B and the light receiver 56B constitute another timing sensor. The timing signals generated by these timing sensors are used to determine the timing of light emission performed by the stroboscopes 53, 53, 54, and 54 and image capture performed by the cameras 51 and 52 thereafter.

Furthermore, the camera system 5 also includes a control device 50 for controlling the operations of the above-described devices 51 to 56B. The control device 50 includes a CPU, a ROM, a RAM, and the like, and is connected also to a communication unit 25 of the analysis apparatus 20, in addition to the above-described devices 51 to 56B.

The light emitters 55A and 55B are arranged below the camera 51 near the ground on the front surface side of the golfer G. On the other hand, the light emitters 56A and 56B are arranged near the toes of the feet of the golfer G. The light emitter 55A and the light receiver 56A are arranged on a straight line that is approximately parallel with the direction from the back to the abdomen of the golfer G, and the light emitter 55A and the light receiver 56A face each other (see FIG. 2). The same also applies to the light emitter 55B and the light receiver 56B. The light emitters 55A and 55B always emit light to the light receivers 56A and 56B during a golf swing, and the light receivers 56A and 56B receive this light. However, at the timing when the golf club 4 passes between the light emitters 55A and 55B and the light receivers 56A and 56B, the light from the light emitters 55A and 55B is blocked by the golf club 4, and therefore the light receivers 56A and 56B cannot receive this light. The light receivers 56A and 56B detect this timing and generate a timing signal based thereon. Using the time at which the timing signal was generated as a reference, the control device 50 commands the stroboscopes 53, 53, 54, and 54 to emit light for a predetermined amount of time and commands the cameras 51 and 52 to perform image capture. Sensor data in the format of image data captured by the cameras 51 and 52 is transmitted to the control device 50 and is further transmitted from the control device 50 to the analysis apparatus 20.

2-1-3. Analysis Apparatus

The hardware of the analysis apparatus 20 is a general-purpose computer, and for example, is realized as a desktop computer, a laptop computer, a tablet computer, or a smartphone. As shown in FIG. 3, the analysis apparatus 20 is manufactured by installing a program 23a in a general-purpose computer from a recording medium 27 such as a computer-readable CD-ROM, or via the communication network 8. The program 23a is software for analyzing sensor data transmitted from the inertia sensor unit 30 and the camera system 5, and causes the analysis apparatus 20 to execute later-described operations.

The analysis apparatus 20 includes a display unit 21, an input unit 22, a storage unit 23, a control unit 24, and a transmission unit 25. These units 21 to 25 are connected to each other via a bus line 26 and can communicate with each other. The storage unit 23 can be constituted by a hard disk or the like. The program 23a and the sensor data transmitted from the sensor units 30 and 5 are stored in the storage unit 23. The control unit 24 can be constituted by a CPU, a ROM, a RAM, and the like. The control unit 14 analyzes the actual shot performed by the golfer G based on the sensor data in the storage unit 23 by reading out and executing the program 23a in the storage unit 23. The communication unit 25 functions as a communication interface for exchanging data with external devices such as the sensor units 30 and 5. Measurement data including various types of analysis values obtained as the result of analysis of the shot performed by the control unit 24 are transmitted to the server 3 via the communication unit 25.

The display unit 21 can be constituted by a liquid crystal display or the like, and the result of the analysis of the shot performed by the control unit 24 is displayed to the user. "User" in this context is a collective term for a person who requires the analysis result, such as the golfer G himself or herself, or an instructor of the golfer G. An input unit 22 can be constituted by a mouse, a keyboard, a touch panel, or the like, and receives an operation from the user on the analysis apparatus 20.

2-2. Server

The hardware of the server 3 is a server computer, which is called a database server, a storage server, or the like, includes a non-volatile large-capacity storage device, and is connected to the communication network 8. The measurement data acquired from the measurement device 2 is accumulated in this large-capacity storage device. The server 3 receives, from the virtual golf simulation apparatus 1 via the communication network 8, a request to transmit the measurement data in the large-capacity storage device, and transmits the requested measurement data to the simulation apparatus 1 as appropriate. When the server 3 receives a request to transmit the measurement data, the server 3 performs authentication of the golfer G operating the simulation apparatus 1, which is the access source, and if the authentication succeeds, the server 3 transmits the measurement data to the simulation apparatus 1.

2-3. Virtual Golf Simulation Apparatus

The hardware of the virtual golf simulation apparatus 1 is a general-purpose computer, and for example, is realized as a desktop computer, a laptop computer, a tablet computer, or a smartphone. Also, the simulation apparatus 1 can be realized as any computer possessed by the golfer G. As shown in FIG. 1, the simulation apparatus 1 is manufactured by installing a program 13a in a general-purpose computer from a recording medium 17 such as a computer-readable CD-ROM or via the communication network 8. The program 13a is software for executing virtual golf, and causes the simulation apparatus 1 to execute later-described operations.

The virtual golf simulation apparatus 1 includes the display unit 11, the input unit 12, the storage unit 13, the control unit 14, and the communication unit 15. These units 11 to 15 are connected to each other via the bus line 16 and can communicate with each other. The display unit 11 can be constituted by a liquid crystal display or the like and displays a virtual golf execution screen to the user. The input unit 12 can be constituted by a mouse, a keyboard, a touch panel, or the like and receives an operation from the golfer G, who is the user, on the simulation apparatus 1.

The storage unit 13 can be constituted by a hard disk or the like. The program 13a and the measurement data acquired from the server 3 are stored in the storage unit 13. The control unit 14 can be constituted by a CPU, a ROM, a RAM, and the like. The control unit 14 virtually operates as a data acquisition unit 14a, an analysis unit 14b, a generation unit 14c, an operation receiving unit 14d, a simulation unit 14e, and an output unit 14f by reading out and executing the program 13a in the storage unit 13. The details of the operations of the units 14a to 14f will be described later. The communication unit 15 functions as a communication interface for exchanging data with external devices such as the server 3.

3. Flow of Processing for Executing Virtual Golf

A flow of processing for executing virtual golf will be described next. This processing includes: a measuring step serving as pre-processing for measuring an actual golf shot of the golfer G, and a virtual golf simulation step of simulating the golf shot of the golfer G based on the measurement data at that time. The former step is executed by the measurement device 2, and the latter step is executed by the virtual golf simulation apparatus 1. Also, the latter step is executed by the golfer G operating the simulation apparatus 1 for various purposes, such as the golfer G enjoying virtual golf as a computer game, or understanding his or her own golf ability and learning. In the virtual simulation step according to the present embodiment, a situation in which the golfer G plays a round on a golf course is simulated.

3-1. Measurement Step

The measurement step is executed at a specific location, such as a golf school or a store selling golf equipment, in which the measurement device 2 is installed. In this kind of specific location, the golfer G performs a trial stroke of the golf club 4 for the purpose of fitting the golf club, assessing the golf ability of the golfer G, or the like. That is, the original purpose of the measurement step is not necessarily the same as the purpose for which virtual golf is executed in the virtual golf simulation step. In other words, the measurement data collected in the measurement step is stored in the server 3 and is also used in a later virtual golf simulation step, whereby the golfer G can easily execute virtual golf also in an environment in which the measurement device 2 is not installed.

In the measurement step, first, the golf club 4 to which the above-described inertia sensor unit 30 is attached is swung by the golfer G in the hitting base in which the above-described camera system 5 is installed, and the ball 60 is struck. Hereinafter, the actual shot performed in the measurement step will be referred to as a test shot in some cases. Then, the sensor data, namely the accelerations $a_x$, $a_y$, and $a_z$, the angular velocities $\omega_x$, $\omega_y$, and $\omega_z$, and the magnetism $m_x$, $m_y$, and $m_z$ of the grip 42 during the test shot are measured by the inertia sensor unit 30. These pieces of sensor data are transmitted to the analysis apparatus 20 from inertia sensor unit 30. Meanwhile, the analysis apparatus 20 receives this data via the communication unit 25 and stores it in the storage unit 23. In the present embodiment, at least chronological sensor data from the addressing to the impact is collected.

Also, in the measurement step, image data showing the state near the head 41 and the ball 60 is captured by the camera system 5 before and after the impact during the test shot. These pieces of image data are transmitted as sensor data to the analysis apparatus 20 via the control device 50. Meanwhile, the analysis apparatus 20 receives this data via the communication unit 25 and stores it in the storage unit 23.

Typically, in the measurement step, various types of golf clubs 4 are subjected to trial strokes. In some cases, golf clubs of various categories, such as driver, fairway wood, utility, iron, wedge, and putter, are included among these golf clubs 4, and multiple golf clubs with different numbers are included among golf clubs 4 of the same category (e.g., 3, 5, and 7 irons are included) Then, these golf clubs 4 are sequentially subjected to trial strokes, and the pieces of sensor data are individually collected for each golf club 4.

The control unit 24 calculates various analysis values by analyzing the sensor data in the storage unit 23 with respect to each golf club 4 subjected to a trial stroke by the golfer G. In the present embodiment, the flight distance of the ball 60, head velocity (typically, the velocity of the head 41 immediately before impact), ball velocity (typically, the initial velocity of the ball 60), the launch angle (vertical launch angle) of the ball 60, lateral deflection angle at the time of striking the ball 60, spin amount of the ball 60, degree of variation (typically, the standard deviation indicating variation in the lateral distance of the trajectory), face angle (typically, the face angle immediately before impact), head path angle (typically, the head path angle immediately before impact), and the like are measured as this kind of analysis value. Note that some golfers G have a long flight distance at a golf driving range or in the measurement performed by the measurement device 2, but do not have a long flight distance at a golf course. In such a case, the flight distance of the ball 60 can also be set by the golfer G manually instead of being an analysis value obtained based on sensor data. Also, since various methods are known as methods for calculating the above-described analysis values based on the above-described sensor data, detailed description thereof is not included here. Also, in the present embodiment, the golf clubs 4 are subjected to a trial stroke multiple times each, and preferably 2 to 5 times each. In this case, the average value of each of the various analysis values can be calculated based on sensor data corresponding to multiple instances of trial strokes (note that the variation degree is excluded), and by using this average value, the accuracy of analysis can be improved.

As described above, the various calculated analysis values are consolidated for each golf club 4 on a screen indicating the measurement results, and are displayed on the display unit 21. Based on this, the user can select a golf club that is suitable for the golfer G or assess the golf ability of the golfer G.

Also, the various analysis values calculated as described above are transmitted to the server 3 and stored therein as measurement data obtained by the measurement device 2. In the server 3, the measurement data is stored in association with information (hereinafter referred to as "club ID") identifying the type of the corresponding golf club 4. Also, the measurement data is stored in association with the club ID, as well as information identifying the golfer G (hereinafter referred to as "golfer ID"). Note that the measurement data to be transmitted to the server 3 from the analysis apparatus 20 may also include the sensor data itself instead of or in addition to the above-described analysis values. In this case, in the later-described virtual golf simulation step, the simulation apparatus 1 can analyze the shot characteristic of the golfer G based on the sensor data.

3-2. Virtual Golf Simulation Step

Figure 4:
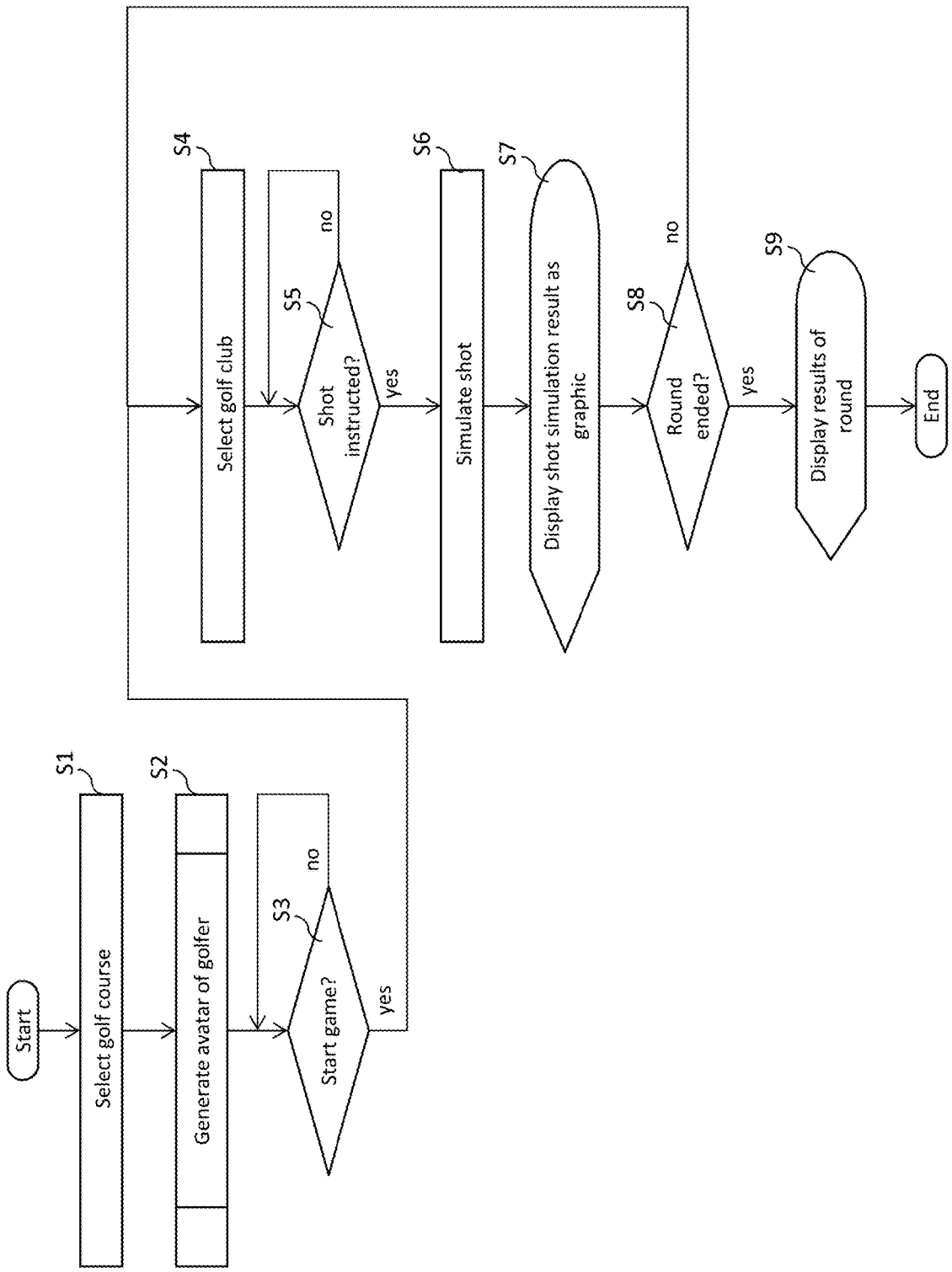
FIG. 4 is a flowchart showing a flow of a virtual golf simulation step.

Next, the virtual golf simulation step will be described with reference to FIG. 4. The virtual golf simulation step is started by the golfer G performing a specific operation on the input unit 12 of the simulation apparatus 1 and starting up an application (hereinafter referred to as "golf application") for executing virtual golf implemented by the program 13a. Due to the startup of the golf application, a screen for executing virtual golf (hereinafter referred to as "golf screen") is displayed on the display unit 11. The golf screen is generated by the output unit 14f.

Figure 6:
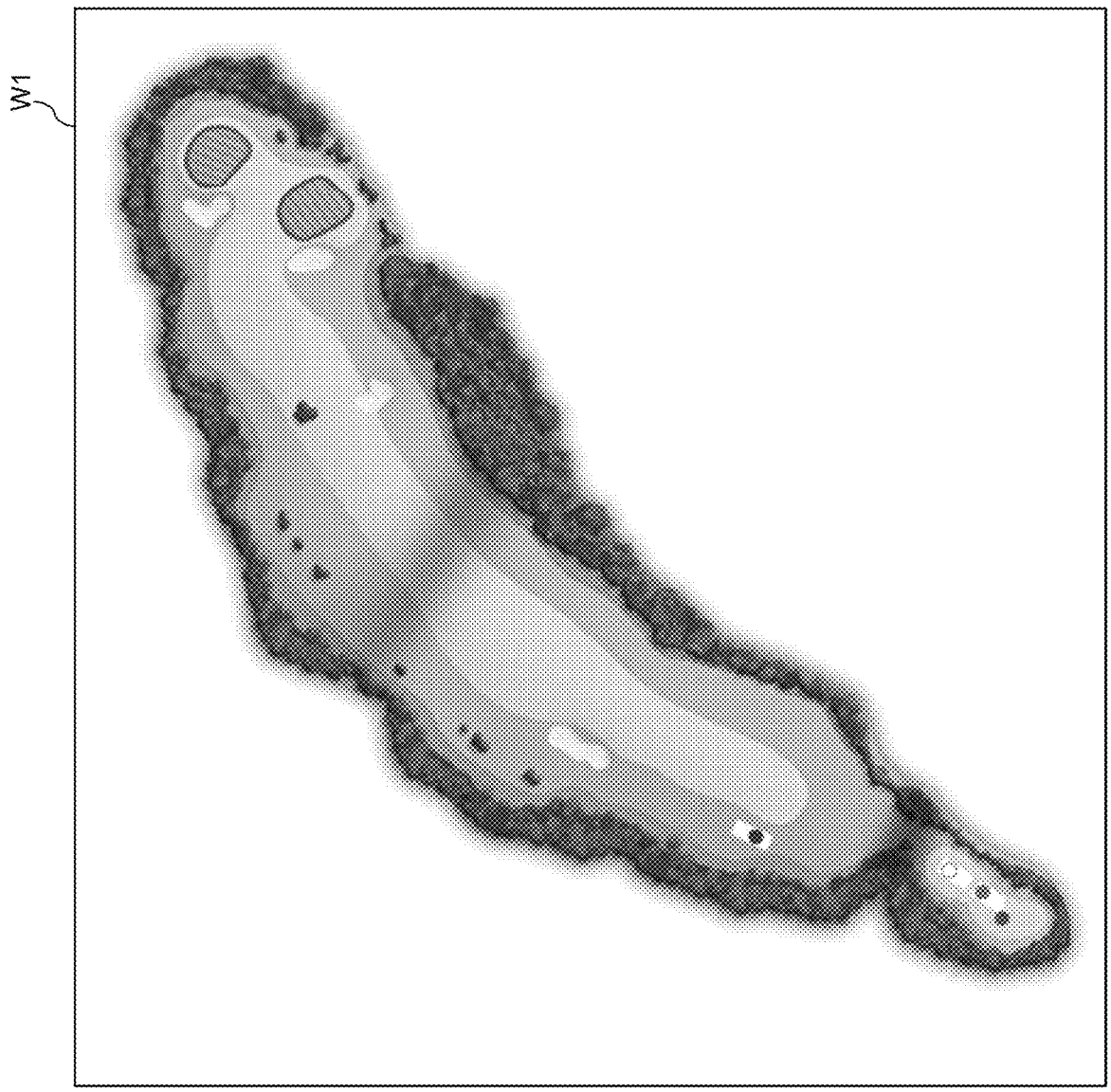
FIG. 6 shows an example of a golf screen displaying a golf course in a planar form.

In the present embodiment, virtual golf progresses such that the golfer G virtually plays a round on a golf course in a virtual space. For this reason, in step S1, the operation receiving portion 14d receives selection of a golf course from the golfer G. Multiple golf courses set in the golf application are presented as options on the golf screen, and the golfer G can select a specific golf course by performing a predetermined operation on the input unit 12. The simulation unit 14e sets the golf course selected according to the operation as the golf course on which a virtual round is to be played. The output unit 14f displays the selected golf course as a graphic. FIG. 6 is an example of this kind of screen W1, and the output unit 14f generates the golf screen W1, which includes an image (plan view) showing the selected golf course in two dimensions, and displays the generated golf screen W1 on the display unit 11.

Figure 5:
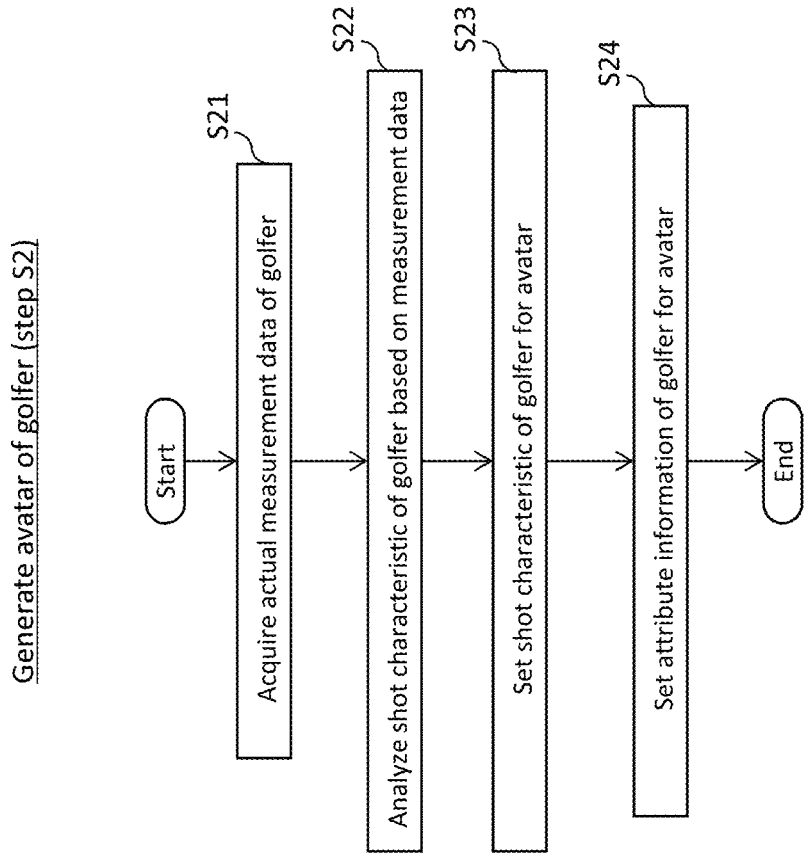
FIG. 5 is a flowchart showing a flow of a routine for generating an avatar for a golfer.

Next, in step S2, an avatar of the golfer G, who is the player of virtual golf, is generated. The avatar is a virtual golfer who performs virtual golf in a virtual space, and hereinafter the reference numeral Gv will be given to the avatar as well. The avatar Gv is generated in accordance with the flowchart shown in FIG. 5. First, the data acquisition unit 14a accesses the server 3 via the communication network 8 and acquires the measurement data and related information (including the club ID) corresponding to the golfer G from the server 3 (step S21). At this time, the server 3 performs authentication of the golfer G based on the golfer ID. That is, the data acquisition unit 14a transmits the golfer ID input by the golfer G via the input unit 12 to the server 3, and the server 3 receives the golfer ID and determines whether or not access of the measurement data is possible. If authentication of the golfer G succeeds, the measurement data and related information corresponding to the golfer G are transmitted from the server 3 to the simulation apparatus 1.

Next, the analysis unit 14b analyzes the shot characteristic of the golfer G based on the measurement data and the related information downloaded from the server 3 (step S22). More specifically, the analysis unit 14b calculates values indicating the shot characteristic of the golfer G (hereinafter referred to as "shot characteristic values") based on the above-described various analysis values included in the measurement data. In the present embodiment, the shot characteristic values of the golfer G are calculated for each golf club that can be selected in the later-described step S4, based on the measurement data as well as the club IDs included in the related information.

Similarly to the above-described various analysis values, the shot characteristic values calculated in the present embodiment include the flight distance, the head velocity, the ball velocity, the launch angle, the lateral deflection angle, the spin amount, the variation degree, the face angle, and the head path angle, as well as lateral deflection, missed shot direction, and missed shot probability. The value of the flight distance obtained with a golf club for which shot measurement was actually performed (hereinafter referred to as "test club"), the value of the flight distance being included in the measurement data, is used as-is as the value of the flight distance obtained with the test club. On the other hand, the flight distance obtained with a golf club for which shot measurement has not actually been performed (hereinafter referred to as "non-test club") is estimated based on the measurement data relating to the test club. For example, the analysis unit 14b specifies the proportional relationship between the flight distance and a predetermined parameter based on the flight distance obtained with the test club, and thus the flight distance obtained with the non-test club can be calculated based on the proportional relationship. Note that, in general, due to the fact that the loft angle decreases and the flight distance increases the smaller the club number and the club length are, the club number, club length, loft angle, or the like can be used as the parameter in this context.

Lateral deflection, which is a shot characteristic value, is calculated based on information for determining the trajectory of the ball 60 (hereinafter referred to as "trajectory information"), such as the ball velocity, launch angle, lateral deflection angle, and spin amount. If the ball velocity is abnormal, it can be corrected by referencing the head velocity, and therefore the head velocity can also be included in the trajectory information. The missed shot direction is also calculated based on the trajectory information included in the measurement data. For example, based on the lateral deflection angle and the side spin amount, it is possible to determine whether or not there is a tendency to go left and curve to the left, whether or not there is a tendency to go right and curve to the right, and the like. The missed shot probability is also calculated based on the trajectory information included in the measurement data. For example, the missed shot probability can be calculated as the number of times a trajectory classified as a missed shot was measured, divided by the number of test shots. Note that the missed shot probability may also be adjusted based on the head path and the face angle (e.g., based on the deviation of the head path and the face angle) included in the measurement data. Also, similarly to the case of the flight distance, shot characteristic values other than the flight distance of a test club can be calculated based on the measurement data of a test club, and shot characteristic values other than the flight distance of a non-test club can be estimated based on the measurement data of the test club. Note that if the sensor data is included in the measurement data, the sensor data can also be used when the shot characteristic values are to be calculated.

Figure 7:
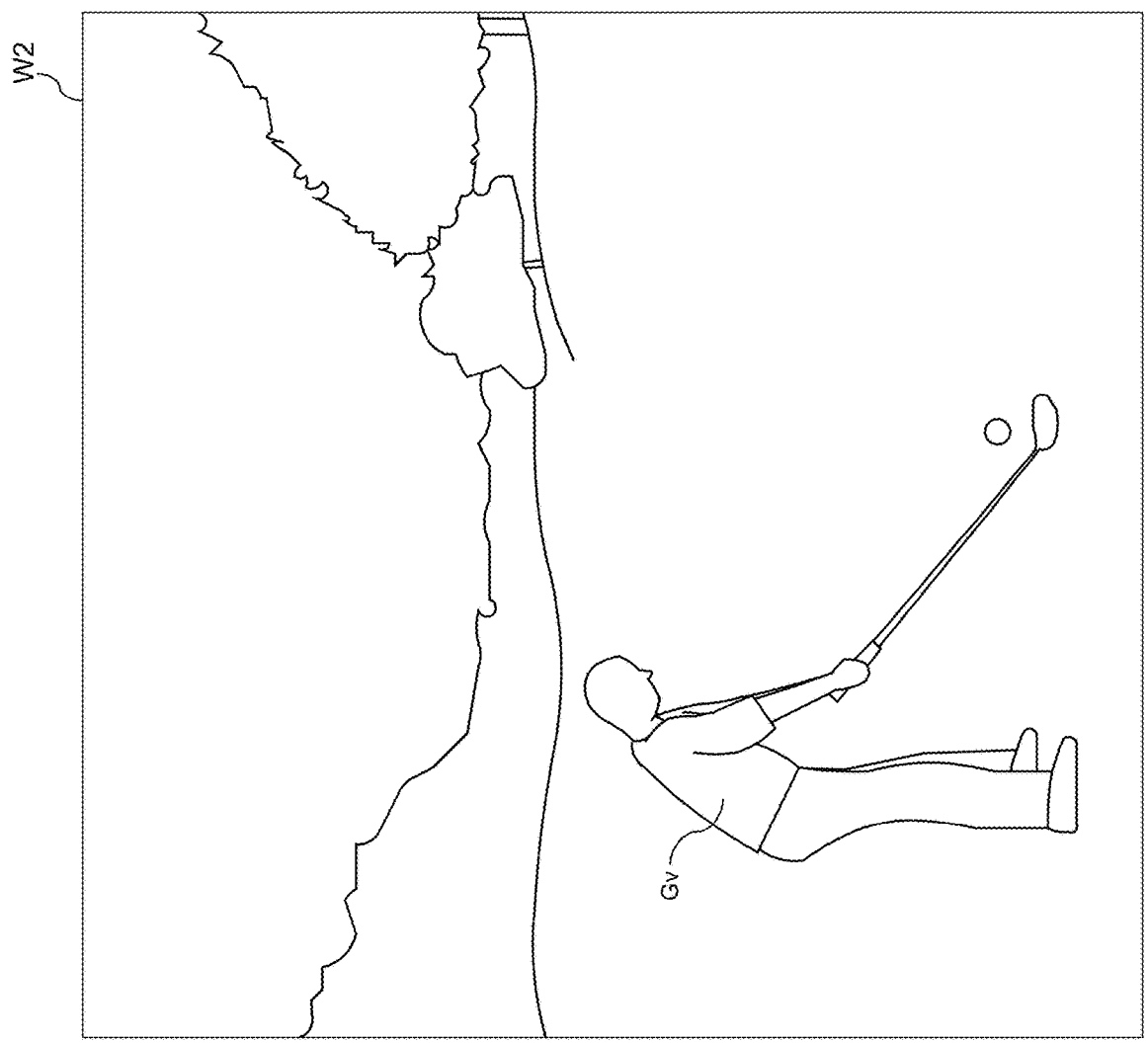
FIG. 7 shows an example of a golf screen displaying an avatar performing a shot on the golf course in three dimensions.

Next, the generation unit 14c generates an avatar having a characteristic corresponding to the shot characteristic of the golfer G (step S23). In the present embodiment, the shot characteristic values calculated in step S22 are set as-is as the shot characteristic values indicating the ability of the avatar Gv playing in the virtual space. Also, the generation unit 14c sets the shot characteristic values and the attribute information of the golfer G for the avatar Gv (step S24). The attribute information in this context includes, for example, the gender, name (including nickname), age, body type, and the like of the golfer G. In the present embodiment, as shown in FIG. 7, an image showing the golf course in three dimensions is generated on the golf screen W2, and an image in which a character imitating the avatar Gv moves in the golf course is generated. The attribute information set here is used to generate the image of the avatar Gv.

In step S2, the character executing virtual golf is set. This character is the avatar Gv of the golfer G, that is, an alter ego in a virtual space, which embodies various characteristics of the golfer G. Accordingly, when virtual golf is executed as a game, the game performance improves. Also, due to the avatar Gv, which has the same characteristics as the golfer G, playing virtual golf, the golfer G can accurately understand his or her own ability, can prepare for or review a round of a golf course, and can learn a method of play during a round, which is suited to the golfer G.

When the setting of the avatar Gv is complete, a golf game can be started. The operation receiving unit 14d receives a command to start the game from the golfer G, and when the golfer G performs a predetermined operation via the input unit 12, the game starts (step S3).

When the game starts, first, the operation receiving unit 14d receives the selection of the golf club to be used by the avatar Gv in the next shot from the golfer G (step S4). Multiple golf clubs set in the golf application are presented as options on the golf screen, and the golfer G can select a specific golf club by performing a predetermined operation on the input unit 12. The simulation unit 14e sets the golf club selected according to the operation as the golf club to be used in the next shot.

After the golf club is set, the output unit 14f displays the golf course and the avatar Gv as graphics. FIG. 7 is an example of this kind of screen W2, and the output unit 14f generates the golf screen W2, which includes an image showing, in three dimensions, a scene of the virtual space, that is, the hitting base for performing the next shot on the golf course and scenery viewed in the ball flight direction from the hitting base, and the output unit 14*f* displays the generated golf screen W2 on the display unit 11. The attribute information set in step S24 is reflected in the form of the avatar displayed here, and the shape of the golf club selected in step S4 is reflected in the shape of the golf club held by the avatar Gv displayed here.

When the above-described golf screen is displayed, the operation receiving unit 14*d* receives, from the golfer G, an instruction for causing the avatar Gv to perform the next shot on the golf course (step S5). Information prompting input of the direction and strength of the shot is presented on the golf screen, and due to the golfer G performing a predetermined operation on the input unit 12, the direction and strength of the specific shot can be selected, and the avatar Gv can be instructed to perform the next shot.

When the instruction to perform the next shot is input from the golfer G, the simulation unit 14*e* simulates the shot of the avatar Gv in the golf course in accordance with the instruction (step S6). Specifically, the simulation unit 14*e* simulates the trajectory of the ball 60 based on the shot characteristic values of the avatar Gv with the currently-selected golf club, and based on the direction and strength of the shot input in step S5. The simulation unit 14*e* also simulates the point at which the ball 60 lands on the golf course. The point at which the ball lands is calculated using, as a reference, a position (hereinafter referred to as "reference position") separated from the current position of the ball by the flight distance of the shot characteristic values, in a direction shifted from the direction of the shot in step S5 in accordance with the lateral deflection of the shot characteristic values. The simulation unit 14*e* can determine the final point at which the ball lands by, after calculating the reference position, shifting the reference position according to the variation degree. Also, the simulation unit 14*e* causes the avatar Gv to perform a missed shot at the missed shot probability of the avatar Gv with the currently-selected golf club. In this case, the final point at which the ball lands is shifted in the missed shot direction from the reference position. Note that the flight distance at the time of a missed shot, the variation degree for the flight distance, and the missed shot probability for the flight distance may be calculated as shot characteristic values, and when the final point at which the ball lands is to be calculated, the flight distance may be adjusted in addition to the direction of the shot. Also, the simulation unit 14*e* simulates not only the behavior of the ball 60, but also the behavior of the golfer G and the golf club during the shot, based on similar information. The missed shot probability can also be set as appropriate by the golfer G instead of being calculated based on the measurement data.

The result of the above-described simulation is displayed as a graphic on the display unit 11 (step S7). In accordance with the result of the simulation relating to the behavior of the avatar Gv, the golf club, and the ball, the output unit 14*f* generates an image showing a situation in which the character imitating the avatar Gv swings the golf club, causing the ball to fly. This image is displayed overlaid on an image of the scenery of the golf course, as shown in FIG. 7.

When the processing for one shot ends, steps S4 to S7 for the next shot are repeated until the round ends (step S8). Accordingly, multiple shots performed by the avatar Gv are simulated successively, and the golfer G can progress along with the avatar Gv while virtually playing a round in the golf course.

When the round ends, the output unit 14*f* generates a golf screen showing results of the round, such as scores, and this golf screen is displayed on the display unit 11. The golfer G can find out his or her play by viewing this golf screen. Then, the golfer G can have a simulated experience as if he or she is actually playing a round of golf, without actually going to a golf course, and can enjoy the simulated experience as a game, and learn golf.

4. Modified Examples

Although an embodiment of the present invention was described above, the present invention is not limited to the above-described embodiment, and various modifications are possible without departing from the gist thereof. For example, the following modifications are possible. Also, the elements of the following modified examples can be combined as appropriate.

4-1

In the above-described embodiment, measurement data collected at a specific location, such as a golf school or a store selling golf equipment, is accumulated in the server 3 on the Internet, and this measurement information is downloaded from the server 3 to a terminal (virtual golf simulation apparatus 1) possessed by the golfer G and is used to set the avatar Gv. However, the measurement data may also be accumulated in the storage unit 25 of the analysis apparatus 20 in which the measurement was performed, and may be directly transferred from the storage unit 25 to the simulation apparatus 1 possessed by the golfer G, or virtual golf may be executed by the analysis apparatus 20.

4-2

The analysis of the shot characteristic of step S22 in the above-described embodiment may also be executed by the analysis apparatus 20. In this case, the result of the analysis performed by the analysis apparatus 20 is registered in the server 3 in advance, and if the analysis result is downloaded to the virtual golf simulation apparatus 1 during execution of virtual golf, the execution of step S22 by the simulation apparatus 1 can be omitted. In the present example, the control unit 24 of the analysis apparatus 20 operates as an analysis unit for analyzing the shot characteristic of the golfer G.

4-3

In the above-described embodiment, all of the shot characteristic values of the avatar Gv were set to the same values as the actual shot characteristic values of the golfer G, but some or all of the shot characteristic values of the avatar Gv may be different from the actual shot characteristic values of the golfer G. That is, an avatar having a higher or lower ability than the actual ability of the golfer G can also be generated according to selection performed by the user, or automatically. Even in this kind of case, if the shot characteristic of the avatar Gv is set according to the shot characteristic of the golfer G, it is possible to generate an avatar Gv in which the ability of the golfer G is reflected. It is also possible to use a configuration in which the ability of the avatar Gv develops when the avatar Gv repeatedly executes virtual golf, and in this case, the game performance of virtual golf can also be improved. Instead of or in addition to this, it may also be possible to allow the golfer G executing virtual golf to develop the ability of the avatar Gv by paying the distribution source of the golf application or the like via the communication network 8.

4-4

In the above-described embodiment, the avatar Gv was displayed in three dimensions as a graphic, but it can also be displayed in two dimensions as a graphic. For example, in the plan view of the golf course shown in FIG. 6, an icon indicating the avatar Gv may be displayed at the current position of the avatar Gv.

4-5

The simulation unit 14e may also control the shot of the avatar Gv according to a timing at which the golfer G operates an operation element of the input unit 12. That is, parameters for determining each shot of the avatar Gv in virtual golf, such as the direction and strength of the shot, may also be determined according to the operation sensation obtained when the golfer G operates the input unit 12.

LIST OF REFERENCE NUMERALS

1 Virtual golf simulation apparatus
2 Measurement device
3 Server
13a Program (virtual golf simulation program)
14a Data acquisition unit
14b Analysis unit
14c Generation unit
14d Operation receiving unit
14e Simulation unit
14f Output unit
G Golfer
Gv Avatar (virtual golfer)

What is claimed is:

1. A virtual golf simulation apparatus comprising a processor, wherein
the processor is connected to an output device and is configured to:
acquire measurement data obtained by using a measurement device to measure an actual shot performed by a golfer;
analyze a shot characteristic of the golfer based on the measurement data;
virtually generate a virtual golfer having a shot characteristic corresponding to the shot characteristic of the golfer;
receive, from the golfer, an instruction instructing the virtual golfer to perform an other shot based on the shot characteristic in a virtual space;
simulate the other shot of the virtual golfer in the virtual space in accordance with the instruction; and
output a result of the simulation to the output device.

2. The virtual golf simulation apparatus according to claim 1, wherein the processor is configured to
receive selection of a golf course serving as the virtual space, and
successively simulate shots of the virtual golfer such that the virtual golfer virtually progresses through the golf course.

3. The virtual golf simulation apparatus according to claim 2, wherein the processor is configured to
successively simulate multiple shots so as to cause the virtual golfer to play a virtual round in the golf course.

4. The virtual golf simulation apparatus according to claim 1, wherein
the measurement data includes data relating to at least one of a flight distance, a head velocity, a ball velocity, a launch angle, a lateral deflection angle, a spin amount, a variation degree, a face angle, and a head path angle.

5. The virtual golf simulation apparatus according to claim 1, wherein
the shot characteristic includes characteristics relating to at least one of the flight distance, lateral deflection, a miss direction, and a missed shot probability.

6. The virtual golf simulation apparatus according to claim 1, wherein the processor is configured to:
for each shot of the virtual golfer, receive selection of a golf club to be used by the virtual golfer, out of a group of a plurality of types of golf clubs selected from a driver, a fairway wood, a utility, an iron, a wedge, and a putter.

7. The virtual golf simulation apparatus according to claim 2, wherein the processor is configured to:
for each shot of the virtual golfer, receive selection of a golf club to be used by the virtual golfer, out of a group of a plurality of types of golf clubs selected from a driver, a fairway wood, a utility, an iron, a wedge, and a putter.

8. The virtual golf simulation apparatus according to claim 3, wherein the processor is configured to:
for each shot of the virtual golfer, receive selection of a golf club to be used by the virtual golfer, out of a group of a plurality of types of golf clubs selected from a driver, a fairway wood, a utility, an iron, a wedge, and a putter.

9. The virtual golf simulation apparatus according to claim 1, wherein the processor is configured to:
generate an image showing the virtual space in two dimensions or three dimensions.

10. The virtual golf simulation apparatus according to claim 2, wherein the processor is configured to:
generate an image showing the virtual space in two dimensions or three dimensions.

11. The virtual golf simulation apparatus according to claim 3, wherein the processor is configured to:
generate an image showing the virtual space in two dimensions or three dimensions.

12. The virtual golf simulation apparatus according to claim 1, wherein the processor is configured to:
generate an image in which a character imitating the virtual golfer moves in the virtual space.

13. The virtual golf simulation apparatus according to claim 2, wherein the processor is configured to:
generate an image in which a character imitating the virtual golfer moves in the virtual space.

14. The virtual golf simulation apparatus according to claim 3, wherein the processor is configured to:
generate an image in which a character imitating the virtual golfer moves in the virtual space.

15. The virtual golf simulation apparatus according to claim 1, wherein the processor is configured to:
acquire the measurement data from the measurement device or a server that is connected to the measurement device and in which the measurement data transmitted from the measurement device is accumulated.

16. The virtual golf simulation apparatus according to claim 2, wherein the processor is configured to:
acquire the measurement data from the measurement device or a server that is connected to the measurement device and in which the measurement data transmitted from the measurement device is accumulated.

17. The virtual golf simulation apparatus according to claim 3, wherein the processor is configured to:
acquire the measurement data from the measurement device or a server that is connected to the measurement device and in which the measurement data transmitted from the measurement device is accumulated.

18. A non-transitory computer readable medium storing a virtual golf simulation program for causing a computer connected to an output device to execute:

acquiring measurement data obtained by using a measurement device to measure an actual shot performed by a golfer;

analyzing a shot characteristic of the golfer based on the measurement data;

virtually generating a virtual golfer having a shot characteristic corresponding to the shot characteristic of the golfer;

receiving, from the golfer, an instruction instructing the virtual golfer to perform an other shot based on the shot characteristic in a virtual space;

simulating the other shot of the virtual golfer in the virtual space in accordance with the instruction; and outputting a result of the simulation to the output device.

19. A virtual golf simulation method, comprising:

acquiring measurement data obtained by using a measurement device to measure an actual shot performed by a golfer;

analyzing a shot characteristic of the golfer based on the measurement data;

virtually generating a virtual golfer having a shot characteristic corresponding to the shot characteristic of the golfer;

receiving, from the golfer, an instruction instructing the virtual golfer to perform an other shot based on the shot characteristic in a virtual space;

simulating the other shot of the virtual golfer in the virtual space in accordance with the instruction; and outputting a result of the simulation to an output device.

* * * * *